Nov. 1, 1927.  
B. PHILLIPS  
SAFETY DEVICE FOR TROLLEY CARS  
Filed July 27, 1925
1,647,469
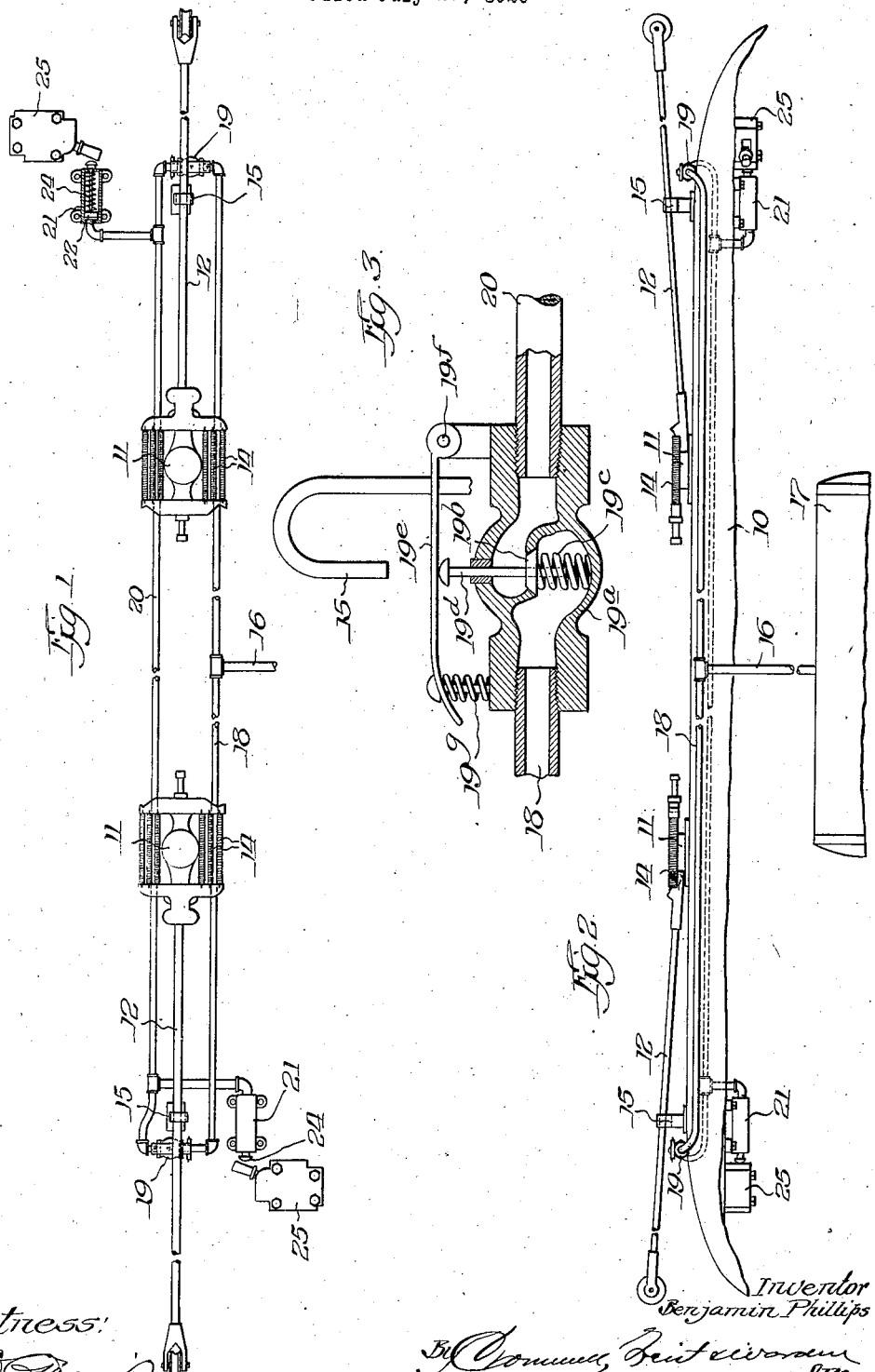

Patented Nov. 1, 1927.

1,647,469

UNITED STATES PATENT OFFICE.

BENJAMIN PHILLIPS, OF CHICAGO, ILLINOIS.

SAFETY DEVICE FOR TROLLEY CARS.

Application filed July 27, 1925. Serial No. 46,277.

This invention has to do with a special safety device for trolley cars, and is designed to eliminate a source of frequent accidents in the operation and handling of that equipment.

It sometimes occurs, as a trolley car is being turned into the barn or yard at the finish of a run, that the conductor will pull down the trolley pole and the motorman will bring the car to a stop at the desired place by application of the brakes, but without turning the controller completely off. Subsequently, when the car is taken over by a new crew, or it is desired to move it to another location in the barn or yard, some individual will put the trolley back on the wire, in ignorance of the fact that the controller is not turned off completely, and thus start the car with no one aboard to control it. Such happenings result in injuries to persons and equipment.

The present invention is designed to preclude a happening of the sort described by rendering it impossible for the car to be started after the trolley pole has been either hooked down or detached from its hook, without there being someone at the controller.

Various incidental objects and advantages of the invention will be pointed out hereinafter, indicated in the appended claims, or obvious to one skilled in the art upon an understanding of the present disclosure.

For the purpose of this application, I have illustrated in the accompanying drawing forming a part of the specification, an embodiment of the invention in a more or less diagrammatic fashion, the same representing what I now regard as a preferred embodiment. It is to be understood, however, that this is presented for purpose of illustration merely and is not to be construed as limiting the invention which I claim to the particular structure, arrangement or instrumentalities which are shown and described.

In the drawing,

Fig. 1 is a top or plan view of a major portion of the apparatus showing its association with the trolley poles and stands and circuit breakers, one of the switch throwing cylinders being shown in section.

Fig. 2 is a side elevational detail showing the association of the apparatus with the top of a car, Fig. 3 is a detail in the nature of a sectional elevation of a control device.

Described generally, the invention contemplates the provision of means associated with the trolley pole, or with the hook which is used to hold the trolley pole in its lowered position, which means is rendered effective either by the hooking of the pole in its lowered position, or its restoration from its lowered position, to open the circuit between the pole and the motor, as by the opening of the customary circuit breaker above the controller.

A more definite understanding of the invention may be had by referring in detail to the illustrative embodiment shown in the drawing, wherein it will be understood that the reference character 10 designates a top or roof portion of a car upon which are mounted the trolley stands 11, carrying the trolley poles 12, the latter being constrained toward an elevated position by springs 14, in the customary fashion. The customary hooks 15 are arranged for reception of the poles to hold them in lowered position. A pipe 16 leads from the customary compressor or compressed air tank 17 of the air brake system, to a pipe 18 which may be arranged conveniently on the top of the car. This pipe is arranged for communication, through control devices 19, with a pipe 20, which supplies the air cylinders 21. Within these cylinders operate pistons 22 carrying the plungers 24 arranged for cooperation with a suitable switch device 25, such as the customary circuit breaker whereby the circuit between the trolley pole and the motor may be opened and closed. The control devices include the valve housing 19$^a$ containing the valve 19$^b$ which is normally held seated by a spring 19$^c$. Valve stem 19$^d$ extends upwardly into cooperation with a lever 19$^e$ which is pivoted at 19$^f$ and normally held in its upper position by a spring 19$^g$. One of the control devices is associated with each of the hooks 15 in such relationship that the manipulation of the pole in the operation of engaging it in the hook, or disengaging it therefrom, must of necessity depress the lever 19$^e$ and unseat the valve 19$^b$. This will admit air under pressure from the pipe 18 to the pipe 20 and actuate both the pistons 22 so that their plungers 24 will throw the switch devices 25 to open position. The plungers are returned by their springs 24, the cylinders being vented for that purpose.

The operation of the apparatus is obvious from the foregoing description, from which it will be understood that if the trolley pole has once been engaged with or disengaged from the retaining hook 15, it will be impossible for the car to start under the power of its own motor until some person has closed the circuit breaker or switch device associated with the controller. This assures the presence of an operator at the controller and brake after the trolley has been placed on the wire, before the car can be started. This is of particular importance in the handling of the car by a single individual in the barn. It avoids such contingencies as when a handler opens the controller with the purpose of starting the car, and finding the trolley off, goes back to put the trolley on the wire without closing the controller. By the employment of my invention the starting of the car is prevented until the operator has returned to the controller and closed the switch.

In addition to its primary advantages as a safety device, the invention has further advantages in that it may be embodied in very simple form, is positive and certain in operation, is adapted for installation readily on existing equipment, involves the addition of but little weight, and does not interfere with other portions of the equipment.

What I claim is:

1. In a trolley car, the combination with the pole retaining hook and a manually closing switch in the motor energizing circuit, of means operable by the pole in conjunction with the hook for opening the switch.

2. In a trolley car, the combination with the trolley pole and a manually closing switch in the motor energizing circuit, of a safety device operable by movement of the pole for opening said switch.

3. In a trolley car, the combination with the trolley pole and a manually closing switch in the pole circuit, of means for holding the pole in inoperative position and a safety device operable by the pole for operating the switch to open the circuit.

4. In a trolley car, the combination with the collector and motor energizing circuit, of a retaining device for holding the collector in inoperative position, a safety device operable by the collector on engagement and disengagement with the retaining device and a manually closing circuit breaker operable by the safety device for opening the motor energizing circuit.

5. In a trolley car, the combination with the collector and controller arranged in circuit, of a manually closing switch for opening said circuit, and a safety device operable by the collector for opening the switch.

6. In a trolley car, the combination with a circuit opening device for preventing energization of the motor, of an actuating device for throwing the same and a control device for controlling actuation of the actuating device, said control device being operable by the trolley pole.

7. In a trolley car, the combination with the trolley pole and motor energized circuit, of a manually closing switch for said circuit, and a safety device, operable by the pole in its movement to and from lowered position, for opening the switch.

8. In an electric motor car, the combination with the current collector and the motor, of a device for preventing energization of the motor, means for setting said device in a position preventing energization of the motor, said means operable by the collector in an inoperative position of the latter, said device requiring to be reset independently of the collector to permit energization of the motor.

In testimony whereof I have hereunto subscribed my name.

BENJAMIN PHILLIPS.